United States Patent [19]

Duell et al.

[11] Patent Number: 5,169,632
[45] Date of Patent: Dec. 8, 1992

[54] MICROCAPSULES FROM POLYFUNCTIONAL AZIRIDINES

[75] Inventors: Bradley L. Duell, Woodbury; Daniel B. Pendergrass, Jr., Mendota Heights, both of Minn.

[73] Assignee: Minnesota Mining and Manufacturing Company, Saint Paul, Minn.

[21] Appl. No.: 676,427

[22] Filed: Mar. 28, 1991

[51] Int. Cl.$^5$ .................... A61N 25/28; A61K 9/50
[52] U.S. Cl. .................... 424/408; 424/401; 424/451; 428/402.21
[58] Field of Search .............. 424/489, 490, 492, 493, 424/500, 451, 401; 428/402.21, 408

[56] References Cited

U.S. PATENT DOCUMENTS 2,950,197  8/1960  Allen et al. .................... 96/111
4,402,856  9/1983  Schnoring et al. ............. 428/402.22

Primary Examiner—Thurman K. Page
Attorney, Agent, or Firm—Gary L. Griswold; Walter N. Kirn; Gregory A. Evearitt

[57] ABSTRACT

Microcapsules containing a shell wall and a liquid fill are produced by an interfacial polymerization reaction between a polyfunctional aziridine and at least one other polyfunctional organic coreactant selected from the group of polyacid halides, polycarboxylic acids, polyamines, polyhydroxyl-containing compounds, polythiol-containing compounds, polyisocyanates, polyisothiocyanates, and mixtures thereof.

14 Claims, No Drawings

MICROCAPSULES FROM POLYFUNCTIONAL AZIRIDINES

FIELD OF THE INVENTION

This invention relates to microcapsules and more particularly, this invention relates to microcapsules wherein polyfunctional aziridines are used as one of the primary components in the formation of the shell wall of the microcapsule. This invention also relates to a process for producing microcapsules through an interfacial polymerization reaction.

BACKGROUND OF THE INVENTION

Microencapsulation is the envelopment of small, solid particles, liquid droplets, or gas bubbles with a coating, usually a continuous coating. Many terms are used to describe the contents of a microcapsule such as active agent, active core, core material, fill, internal phase, nucleus, and payload. The coating material used to form the outer surface of the microcapsule is called a coating, membrane, shell, or wall. It may be an organic polymer, hydrocolloid, sugar, wax, metal, or inorganic oxide. Microcapsules usually fall in the size range of between 1 and 2000 microns, although smaller and larger sizes are known.

Complex coacervation and interfacial polymerization are two well known processes for the formation of microcapsules. Complex coacervation is carried out in aqueous solution and is used to encapsulate water-immiscible liquids or water-insoluble solids. In the complex coacervation of gelatin and gum arabic, for example, the water-immiscible substance to be encapsulated is dispersed in a warm, gelatin solution. Gum arabic and water are added, the pH of the aqueous phase adjusted to about 4, and a liquid complex coacervate of gelatin and gum arabic is formed. As long as the coacervate adsorbs on the substance being encapsulated, a coating of complex coacervate surrounds the dispersed droplets or particles of water-insoluble substances to form microcapsules. The gelatin is then crosslinked, typically with an aldehyde such as formaldehyde or glutaraldehyde. A variety of other crosslinking agents are known, including polyfunctional carbodiimides, anyhdrides, and aziridines.

Aldehydes provide only slight crosslinking, however, so the shell walls of the microcapsule remain hydrophilic, swelling in water. Consequently, gelatin microcapsules may be difficult to dry without aggregation. Furthermore, some of the aldehydes, such as formaldehyde, are environmentally undesirable, partially because of their odor.

In interfacial polymerization reactions, the fill is typically a liquid rather than a solid. Interfacial polymerization involves the reaction of various monomers at the interface between two immiscible liquid phases to form a film of polymer that encapsulates the disperse phase. The monomers diffuse together and rapidly polymerize at the interface of the two phases to form a thin coating. The degree of polymerization can be controlled by the reactivity of the monomers chosen, their concentration, the composition of either phase vehicle, and by the temperature of the system.

Microcapsules produced through interfacial polymerization having shell walls composed of polyamides, polyureas, polyurethanes, and polyesters are known; see U.S. Pat. Nos. 3,516,941, 3,860,565, 4,056,610, and 4,756,906. In some instances the shell walls of these conventional microcapsules are very porous and consequently disperse their fill too rapidly for some applications. Therefore, the microcapsules may have to be post-crosslinked with such crosslinking agents as polyfunctional aziridines. The crosslinking provides shell walls with greater structural integrity and reduced porosity. Of course, an obvious disadvantage to post-crosslinking or curing is that it adds another step to the microcapsule production process.

One of the difficulties in producing microcapsules through interfacial polymerization reactions is that the shell wall precursors used can react too slowly with each other at the interfacial boundary of the two different phases containing the reactants. When the latter occurs, the reactants sometimes diffuse past one another and no polymerization reaction will take place. Alternatively, if polymerization does take place, it proceeds too slowly and microcapsules with shell walls having poor structural properties and solubility characteristics will result. As one skilled in the art realizes, it can be very difficult to achieve successful interfacial polymerization between two reactants even though they are known to readily react with one another at room or higher temperatures in solution or other types of polymerization reactions which do not occur at an interfacial boundary. Therefore, in general, the fact that two materials will react readily in the latter environment is not necessarily an indication that they will react well in interfacial polymerization reactions.

It was against this background that Applicants began their search for microcapsules which could be produced by an efficient process and yet which also possessed shell walls having excellent structural properties and solubility characteristics. In the course of their investigations, Applicants discovered that microcapsules containing shell walls which are formed by using polyfunctional aziridines as one of the primary reactants in the microcapsule production process during interfacial polymerization possess such characteristics.

Although polyfunctional aziridines have been used as a crosslinking agent for the shell walls of gelatin compositions as disclosed in U.S. Pat. No. 2,950,197, there has been no disclosure to date of which Applicants are aware that polyfunctional aziridines have been used as one of the primary shell forming components in microcapsules. When the polyfunctional aziridines have been used as crosslinking agents (i.e. typically at levels of less than about 5 wt %), they have not been incorporated into the polymeric backbone of the shell wall of the microcapsule as opposed to when they are employed as a primary shell-forming component. Although polyfunctional aziridines are known to react with a wide variety of other polyfunctional organic compounds at either room or higher temperatures, there has been no indication from the literature as to whether or not polyfunctional aziridines would be suitable as reactants in interfacial polymerization where the reaction must take place very quickly in order to get desirable shell wall properties as explained before. Typical crosslinking reactions involving aziridines and other crosslinkers generally proceed over several hours or days, not seconds or minutes as required in an interfacial polymerization reaction.

SUMMARY OF THE INVENTION

By the present invention, it has been discovered that polyfunctional aziridines can react readily with a variety of other polyfunctional organic compounds through an interfacial polymerization reaction to produce microcapsules which possess a wide range of porosities, mechanical and structural properties, and solubility characteristics.

The microcapsules of this invention comprise a fill and a shell wall wherein the shell wall is produced by an interfacial polymerization reaction between a polyfunctional aziridine and at least one other polyfunctional coreactant selected from the group consisting of polyacid halides, polycarboxylic acids, polyamines, polyhydroxyl-containing compounds, polythiol-containing compounds, polyisocyanates, polyisothiocyanates, and mixtures thereof.

The use of polyfunctional aziridines presents a number of advantages. To begin with, they are capable of quickly reacting with a wide variety of different polyfunctional organic groups in an interfacial polymerization reaction. Additionally, such interfacial polymerization reactions can be carried out under a wide range of reaction conditions since the polyfunctional aziridines are known to be soluble in both aqueous and water-immiscible organic mediums. Finally, the fact that a wide variety of different functional groups can be incorporated into the polymeric backbone of the shell wall allows one to produce microcapsules having a wide range of shell wall porosities, mechanical and structural properties, and solubility characteristics.

Other aspects, advantages, and benefits of the present invention are apparent from the detailed disclosure, examples, and claims.

DETAILED DESCRIPTION OF THE INVENTION

As used herein, the term "polyfunctional aziridine" refers to an organic compound in which at least one aziridine ring and another reactive functional group are present.

Polyfunctional aziridines are well known in the literature; see for example, U.S. Pat. No. 3,255,013 and Japanese Patent Application No. 53-35869. They can be produced by conventional methods well known to those skilled in the art such as, for example, the reaction between ethyleneimine and a suitable ethylenically unsaturated compound or between ethyleneimine and a chlorocarbamate of a difunctional alcohol in the presence of an acid acceptor.

The preferred polyfunctional aziridines used in the present invention have the following structural formula (as disclosed in U.S. Pat. No. 3,225,013):

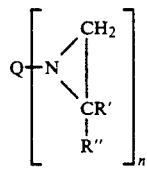

wherein:
Q is a n-valent inorganic, aliphatic, aromatic, or alicyclic organic radical;
n is an integer of at least 2 and preferably is 3 or 4;
N is nitrogen and is preferably linked to an atom having a valence of 4 or 5 (most preferably carbon or phosphorus); and
R' and R" individually represent hydrogen or an alkyl or aryl group, preferably an alkyl group having from 1 to 8 carbon atoms, and most preferably having 1-4 carbon atoms.

Q may be an aliphatic, aromatic, or alicyclic organic radical which may contain heteroatoms such as, for example, oxygen, sulfur, or nitrogen.

Q may also be an inorganic radical such as

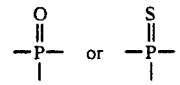

Preferably Q is an organic group containing a carbonyl group and is preferably selected from the group consisting of:

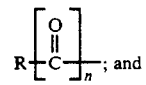

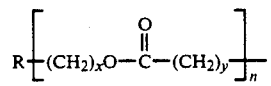

wherein R is a n-valent aliphatic, aromatic, or alicyclic radical which may contain atoms other than carbon, e.g., oxygen, nitrogen or sulfur, and each of x and y is 0 or 2; and n is as defined above.

Non-limiting examples of polyfunctional aziridines which may be used in the present invention include:
trimethylol propane tris[3-aziridinyl propionate];
trimethylol propane tris[3(2-methyl-aziridinyl)-propionate];
trimethylol propane tris[2-aziridinyl butyrate];
tris(1-aziridinyl)phosphine oxide;
tris(2-methyl-1-aziridinyl)phosphine oxide;
pentaerythritol tris-3-(1-aziridinyl propionate); and
pentaerythritol tetrakis-3-(1-aziridinyl propionate).

The polyfunctional aziridines utilized in the present invention undergo interfacial polymerization reactions with a wide variety of other polyfunctional coreactants selected from the group consisting of polyacid halides, polycarboxylic acids, polyamines, polyhydroxyl-containing compounds, polythiol-containing compounds, polyisocyanates polyisothiocyanates, and mixtures thereof.

The general reaction mechanisms between aziridines and the foregoing polyfunctional organic groups are known. For a thorough discussion of aziridines and the reactions they undergo with the coreactants disclosed in this application, see the Kirk-Othmer Encyclopedia of Chemical Technology, Volume 13, pp. 142-166, (1981).

Generally, the polyfunctional aziridines will react with polyacid halides, polyisocyanates, polycarboxylic acids, polyamines, polyhydroxyl-containing compounds and polythiol-containing compounds through a ring opening reaction of the aziridine. With the exception of the polyacid halides and polyisocyanates, the other aforementioned compounds all have active hydrogen atoms which will protonate the aziridine nitrogen atom to form an aziridinium (ammonium) nitrogen atom. In the case of the polyacid halides, the acyl group of the acid halide binds to the nitrogen atom which also creates an aziridinium nitrogen atom. After formation of the aziridinium nitrogen, the aziridine ring is opened by nucleophilic attack of a conjugate anion at one of the aziridine carbon atoms. Non-limiting examples of such polyfunctional organic compounds which can be utilized as coreactants with polyfunctional aziridines in the present invention include sebacoyl chloride, terephthaloyl chloride, trimesoyl chloride, ethylenediamine, hexamethylene diamine, and triethylenetetramine.

In the case of the polyisocyanates and polyisothiocyanates, ring opening of the aziridine also takes place after protonation of the aziridine nitrogen with added acid catalyst. Non-limiting examples of such polyfunctional coreactants include toluene diisocyanate and hexamethylene diisocyanate.

Preferred for use in the present invention are polycarboxylic acids, polyacid halides, and polyisocyanates.

In the present invention, the fill within the microcapsule will be a hydrophobic or hydrophilic liquid or solid such as a flavor, fragrance, pigment, pigment dispersion, insecticide, herbicide, pharmaceutical preparation, dye, or solvent. Typically, the shell wall will constitute from 5-95 wt % of the microcapsule and the liquid fill will constitute from 5-95 wt % of the microcapsule, based upon the total weight of the microcapsule. Preferably, the shell wall will constitute from 10-50 wt % and the liquid fill will constitute from 50-90 wt % of the inventive microcapsule.

In one embodiment of the present invention, microcapsules are made by a process which comprises first forming an aqueous phase comprising the fill material and the polyfunctional aziridine. The ratio of fill to polyfunctional aziridine will generally be in the range of about 1-50:1 and preferably about 4-8:1.

The conditions and requirements for producing microcapsules through interfacial polymerization reactions are known. See, for example, P. B. Deasy, *Microencapsulation and Related Drug Processes*, Marcel Dekker, Inc., (1984).

Because polyfunctional aziridines are soluble in a wide variety of solvents, they may be utilized in the present invention in either the aqueous phase or a water-immiscible organic phase. Preferably, the polyfunctional aziridine will be employed in an aqueous based solvent since it usually has the greater solubility in the latter.

Examples of water-immiscible organic solvents which can be utilized in the present invention include, but are not limited to, xylene, hexane, heptane, methylene chloride, mineral oils, and combinations thereof.

When the liquid to be encapsulated has solvating properties, it can sometimes act as the sole solvent for the polyfunctional aziridine or other polyfunctional organic compound which serves as a shell wall precursor. Preferably, though, an additional organic solvent will be employed to provide maximum solubility for the shell wall precursor.

In the typical microencapsulation process by interfacial polymerization, the fill and polyfunctional aziridine or other polyfunctional organic compound are mixed together to form the first phase. Subsequently, the second phase is added. The two phases are then emulsified, such as by shear or agitation of the solution.

Finally, the second shell wall precursor (polyfunctional aziridine or other compound) is added to the resulting emulsion. Preferably, the ratio of the second shell wall precursor to polyfunctional aziridine is in the range of about to 0.5 to 20:1, preferably about 1 to 5:1.

An interfacial polymerization reaction will then proceed with microcapsules being formed. Generally, the reaction temperature is in the range of room temperature to 40° C. and the reaction time is on the order of 30 minutes to 3 hours.

One skilled in the art will realize that there can be modifications and variations to the foregoing reaction conditions and details recited for formation of microcapsules by interfacial polymerization. For example, it may be preferable in some circumstances to add the second shell wall precursor during the emulsification step.

After the reaction process is complete, the microcapsules may be recovered by filtration, washed, and then dried.

The following non-limiting examples further illustrate the present invention.

EXAMPLE 1

This example illustrates the encapsulation of an organic (oil) fill utilizing the inventive process.

A solution of MONDUR ®MRS polyfunctional isocyanate (available from Mobay Chemical Company, Pittsburgh, Pa.) (11.5 g) in 1:1 (v/v) mineral oil/methylene chloride (100 mL) was added to a mixture of 10% aqueous VINOL ® 205 polyvinyl alcohol (Air Products and Chemical Company) (8.0 g), 20% sulfuric acid (0.5 g), and water (300 mL) and the mixture stirred with a Waring turbine at 750 rpm for 2 minutes. A solution of 3.74 grams of trimethyol propane tris[3-(2-methylaziridinyl)-propionate], a trifunctional aziridine available as CX-100 from Polyvinyl Chemical Company, in water (10 mL) was added dropwise over 1 minute and the mixture stirred for 3 hours. A slurry of capsules was obtained, size range 1-200 $\mu$m (75 $\mu$m avg.).

EXAMPLE 2

This example illustrates the encapsulation of an organic (oil) fill utilizing the inventive process.

The same procedure was followed as in Example 1 except that 100 mL Miglyol 812 oil (available from Hüls America, Inc., Piscataway, N.J.) was substituted for the mineral oil/methylene chloride. A slurry of capsules was obtained, size range 1-150 $\mu$m (60 $\mu$m avg.).

EXAMPLE 3

This example illustrates the encapsulation of an organic (oil) fill utilizing the inventive process.

A solution of 11.5 g of MONDUR ® MRS polyfunctional isocyanate in 1:1 (v/v) mineral oil/methylene chloride was stirred with a mixture of 10% aqueous VINOL ® 205 polyvinyl alcohol (8.5 g); 20% sulfuric acid (0.5 g), and water (300 mL) with a Waring turbine at 750 rpm for 2 minutes. A solution of N-(2-hydroxyethyl)ethylenimine ("HEEI") (available from Cordova Chemical Company, Sacramento, Calif.) (1.10 g) in water (10 mL) was added dropwise over 1 minute and the mixture stirred for 3 hours. A slurry of capsules was obtained, size range 1-150 $\mu$m (40 $\mu$m avg.).

EXAMPLE 4

This example illustrates the encapsulation of an organic (oil) fill in a "mixed" shell utilizing the inventive process wherein the "mixed" shell wall is formed by reaction of a polyfunctional aziridine with a mixture of polyisocyanate and polyacid chloride.

The same procedure was followed as in Example 1 except that a mixture of MONDUR ® MRS polyfunctional isocyanate (5.75 g) and phthaloyl chloride (1.28 g) were used as the shell wall forming components. The capsules were collected, washed twice with water, and dried overnight to give 38.9 grams of beige capsules, size range 1-100 μm (50 μm avg.).

EXAMPLE 5

This example illustrates the encapsulation of an aqueous fill into a "mixed" shell wall utilizing the inventive process.

A solution of 3.74 grams trifunctional aziridine trimethyol propane tris[3-(2-methyl-aziridinyl)propionate], 12.6 g glycerol (10 mL), 20% sulfuric acid (0.5 g), and water (10.0 g) was stirred in 1:1 (v/v) mineral oil/methylene chloride (200 mL) with a six-blade paddle turbine (1.375" diameter), paddle size, 0.75"×0.375", long edge parallel to rotor axis at 350 rpm for 1.5 minutes. A solution of phthaloyl chloride (1.28 g) and MONDUR ® MRS (5.75 g) polyfunctional isocyanate in 1:1 (v/v) mineral oil/methylene chloride (100 mL) was added over 15 minutes and the mixture stirred for 6 hours. The capsules were collected, washed twice with cyclohexane, and dried overnight on absorbent paper to give 22.7 g of beige capsules, size range 10-500 μm (250 μm avg.).

EXAMPLE 6

This example illustrates the encapsulation of an aqueous fill utilizing the inventive process.

A solution of CX-100 trifunctional aziridine (3.74 g), glycerol (12.6 g; 10 mL); 20% sulfuric acid (0.5 g), and water (10.0 g) was stirred in mineral oil (200 mL) with a Waring turbine at 400 rpm for 1 minute. A solution of 1,2-propanedithiol (1.48 g) in mineral oil (10 mL) was added over a period of 1.5 minutes and the mixture stirred for 18 hours. Fragile capsules were obtained, size range 1000-2000 μm.

EXAMPLE 7

This example illustrates the encapsulation of an organic (oil) fill utilizing the process of the present invention.

The same procedure as Example 1 was utilized, except that a solution of 1,2-propanedithiol (1.48 g) in mineral oil (10 ml) was substituted for MONDUR ® MRS solution. Fragile capsules were obtained, size range 1-100 μm (50 μm avg.).

EXAMPLE 8

This example illustrates the encapsulation of an organic (oil) fill utilizing the process of the present invention.

The same procedure as Example 1 was utilized, except that a solution 1,12-dodecanediamine (2.73 g) was substituted for the MONDUR ® MRS solution and $H_2SO_4$ was omitted. Fragile capsules were obtained, size range 1-150 μm (60 μm avg.).

EXAMPLE 9

This example illustrates the encapsulation of an aqueous fill utilizing the process of the present invention.

A solution of 3.74 g of XAMA-7 polyfunctional aziridine (believed to be a 50:50 mixture of trimethyol propane tris[3-(1-aziridinyl)propionate]and pentaerythritol tetrakis [3-(1-aziridinyl) propionate]), available from Cordova Chemical Company of Sacramento, Calif.); glycerol (12.6 g; 10 mL); water (10.0 g), and 20% sulfuric acid (0.5 g) was stirred in mineral oil (200 mL) with a six-blade paddle turbine (1.375" diameter, paddle size 0.75"×0.375", long edge parallel to rotor axis) at 250 rpm for 1 minute. A solution of MONDUR ® MRS polyfunctional isocyanate (11.5 g) in 1:1 (v/v) mineral oil/methylene chloride (100 mL) was added over a period of 7 minutes and the mixture stirred for 16 hours. The capsules were collected, washed twice with 1:1 (v/v) mineral oil, twice with cyclohexane, and dried overnight on absorbent paper to give 7.2 g of hard, beige microcapsules, size range 600-2300 μm (1300 μm avg.).

EXAMPLE 10

This example illustrates the encapsulation of an aqueous fill utilizing the inventive process.

A solution of 3.74 g of CX-100 trifunctional aziridine; glycerol (12.6 g; 10 mL); water (10.0 g); and 20% sulfuric acid (0.5 g) was stirred in 1:1 (v/v) mineral oil/methylene chloride (200 mL) with a six-blade paddle turbine (1.375" diameter; paddle size 0.75"×0.375", long edge parallel to rotor axis) at 1200 rpm for 1 minute. A solution of MONDUR ® MRS polyfunctional isocyanate (6.4 g) in 1:1 (v/v) mineral oil/methylene chloride (100 Ml) was added over a period of 7 minutes and the mixture stirred for four hours. The capsules were collected, washed twice with 1:1 (v/v) mineral oil/methylene chloride, twice with cyclohexane, and dried overnight on absorbent paper to give 21.3 g of hard, beige microcapsules; size range 600-1600 μm (100 μm avg.).

EXAMPLE 11

This example illustrates the slow-release properties of a microcapsule prepared utilizing the inventive process.

The process of Example 10, above, was used to prepare capsules of 375 μm average size containing oxytetracycline hydrochloride (OTC-HCL). These capsules were immersed in water and the release of OTC-HCL monitored spectrophotometrically (at 365 nm). The capsules were found to release their contents over a period of approximately 4 weeks. By contrast, polyamide (Nylon 610) capsules containing a glycerol/water solution of sodium hydroxide (prepared by interfacial encapsulation techniques) completely released their capsule contents in less than 15 seconds (the time period required for the pH of the aqueous solution to reach a maximum constant value).

Reasonable variations and modifications are possible from the foregoing disclosure without departing from either the spirit or scope of the present invention as defined by the claims.

We claim:

1. A microcapsule composition comprising a shell wall and a liquid fill, said shell wall produced by an interfacial polymerization reaction between a polyfunctional aziridine and at least one other polyfunctional organic coreactant selected from the group consisting of polyacid halides, polycarboxylic acids, polyamines, polyhydroxyl-containing compounds, polythiol-containing compounds, polyisocyanates, polyisothiocyanates, and mixtures thereof.

2. A microcapsule composition according to claim 1 wherein said shell wall constitutes from 5 to 95 wt % and said liquid fill constitutes from 5 to 95 wt % of said microcapsule composition based upon the total weight thereof.

3. A microcapsule composition according to claim 1 wherein said liquid fill comprises materials selected from the group consisting of a flavor, fragrance, pigment, pigment dispersion, insecticide, herbicide, pharmaceutical preparation, dye, and solvent.

4. A microcapsule composition according to claim 1 wherein said polyfunctional aziridine is represented by the formula:

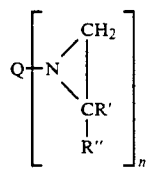

wherein:
Q is a n-valent inorganic, aliphatic, aromatic, or alicyclic organic radical;
n is an integer and is at least 2; and
R' and R" are individually hydrogen, or alkyl, or aryl.

5. A microcapsule composition according to claim 4 wherein Q is:

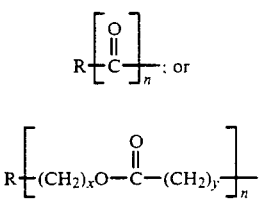

wherein:
R is a n-valent aliphatic, aromatic, or alicyclic radical;
x and y are individually 0 or 2; and
n is an integer of at least 2.

6. A microcapsule composition according to claim 4 where said polyfunctional aziridine is one selected from the group consisting of:
trimethyol propane tris[3,(2-methyl-aziridinyl)-propionate];
trimethylol propane tris[3-aziridinyl-propionate];
trimethylol propane tris[2-aziridinyl butyrate];
tris(1-aziridinyl)phosphine oxide;
tris(2-methyl-1-aziridinyl)phosphine oxide; and
pentaerythritol tris-3-(1-aziridinyl propionate); and
pentaerythritol tetrakis-3-(1-aziridinyl propionate).

7. A microcapsule composition according to claim 6 wherein said polyfunctional aziridine is trimethylol propane tris[3-(2-methyl-aziridinyl)-propionate].

8. A microcapsule composition according to claim 1 wherein said at least one other polyfunctional coreactant is selected from the group of polycarboxylic acids, polyacid halides, and polyisocyanates.

9. A microcapsule composition according to claim 1 wherein said liquid fill and said polyfunctional aziridine are present in an aqueous phase and said at least one other polyfunctional organic coreactant is present in a water-immiscible organic phase in said interfacial polymerization reaction.

10. A microcapsule composition according to claim 9 wherein said at least one other polyfunctional organic coreactant is added to the reaction mixture during emulsification of the aqueous and water-immiscible organic phases.

11. A microcapsule composition according to claim 1 wherein said liquid fill and said at least one other polyfunctional organic coreactant are present in an aqueous phase and said polyfunctional aziridine is present in a water immiscible organic phase in said interfacial polymerization reaction.

12. A microcapsule composition according to claim 11 wherein said polyfunctional aziridine is added to the reaction mixture during emulsification of the aqueous and organic phases.

13. A microcapsule composition according to claim 1 wherein the ratio of said at least one other polyfunctional organic compound to said polyfunctional aziridine during said interfacial polymerization reaction is in the range of about 0.5 to 20:1.

14. A microcapsule composition according to claim 13 wherein the ratio of said polyfunctional organic compound to said polyfunctional aziridine during said interfacial polymerization reaction is in the range of about 1 to 5:1.

* * * * *